April 16, 1957 S. WEINER 2,788,831
APPARATUS FOR STRAIGHTENING METALLIC VEHICLE BUMPERS
Filed Oct. 27, 1953 2 Sheets-Sheet 1

Simon Weiner
INVENTOR.

BY J. Walton Bader
ATTORNEY.

April 16, 1957 S. WEINER 2,788,831
APPARATUS FOR STRAIGHTENING METALLIC VEHICLE BUMPERS
Filed Oct. 27, 1953
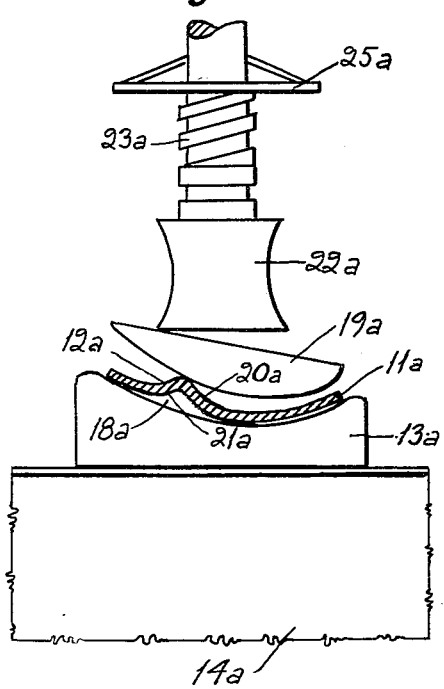
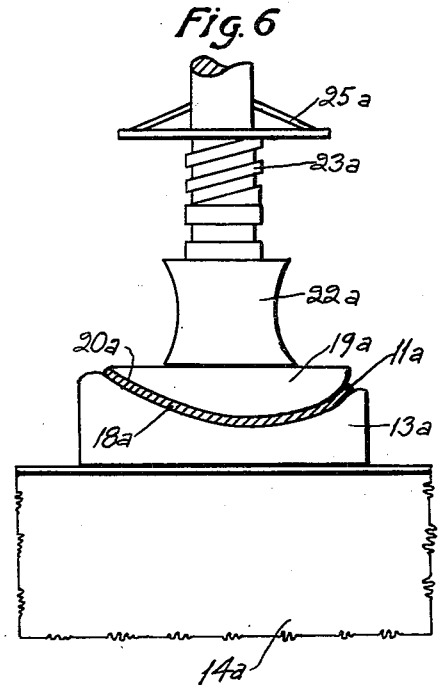
Simon Weiner
INVENTOR.
BY J. Walton Bader
ATTORNEY.

United States Patent Office 2,788,831
Patented Apr. 16, 1957

2,788,831

APPARATUS FOR STRAIGHTENING METALLIC VEHICLE BUMPERS

Simon Weiner, Bronx, N. Y., assignor to Auto Bumper Straightening Dies Corporation, Bronx County, N. Y., a corporation of New York Application October 27, 1953, Serial No. 388,603

1 Claim. (Cl. 153—48)

The invention herein has for its object the production of a method of straightening metallic vehicle bumpers and an apparatus for performing the same.

Metallic vehicle bumpers, as used for automotive vehicles as well as those of other types, are formed of a core of resilient steel coated with a plating of nickel-chromium to prevent corrosion and to give the bumper a shiny appearance.

When such a bumper is struck by another vehicle or a stationary object the blow may be severe enough to produce a dent in the bumper. Such a dent mars the appearance of the bumper. Heretofore the presence of such a dent in a bumper required that the bumper be replaced since if the bumper is re-formed by hammering on the reverse side the normal smooth appearance is not produced. Furthermore because of the differences in the resiliency of the steel core and the surface plating the hammering would cause the plating to become loosened and thereby ruin the appearance of the bumper. The cost of replating is so great as to make this step economically unfeasible.

The process of this invention avoids the above disadvantages and produces a straightened bumper free of dents. The method used preserves the plating and does not allow it to become loosened. The method is inexpensive and can be performed by only semi-skilled workmen.

Briefly stated the method comprises the steps of placing the inner and outer surfaces of the damaged portion of the bumper in contact with forming members of slightly greater size than that of the damaged portion. The forming member abutting against the outer surface of the bumper is formed with inverse curvature to the proper curvature of the portion of the outer surface of the bumper against which it abuts. The forming member abutting against the inner surface of the bumper is formed with the proper curvature of the outer surface of the bumper for the portion involved.

A pressure distributing member is placed above the forming member abutting against the inner surface of the damaged portion of the bumper and pressure is applied to the forming members through the pressure distributing member until the damaged portion of the bumper is forced to assume its proper curvature. The pressure distributing member is in floating contact with the upper forming member. By "floating contact" is meant that type of contact of parts wherein the pressure distributing member merely rests upon the forming member but is not secured thereto at any fixed point. With this type of contact, in the operation of the method of this invention, the upper forming member produces a sidewise as well as an up and down movement as the bumper is straightened and thus smooths out the irregularities. It is also possible to carry out the method of this invention without the use of the pressure distributing member provided that the floating contact between the pressure producing member and the forming members is maintained. When the pressure distributing member is not used, therefore, the pressure producing member is in floating contact with the upper forming member and is not secured thereto. The pressure producing member merely rests upon the upper forming member.

The forming members are prepared prior to their use in the process by selecting a number of automobile or other bumpers and preparing molds using the bumpers as impression making material. The molds produced by the impression of the outer surface of the bumper will have inverse curvature to the outer surface while the molds produced by the impression of the inner surface of the bumper will have the same curvature as the outer surface. The forming members consist of only curvatures of portions of the various bumpers since the damaged portion only covers a small surface area so that the forming members need only cover an area slightly greater than the damaged area. While the damage to the bumper may cause either expansion or contraction the degree of deformation is small enough so that the area covered by the forming members is sufficient to permit them to force the damaged portion into correct relationship with the remainder of the bumper by the squeezing action of the forming members.

The invention will be further described by reference to the accompanying drawings which are made a part of this specification.

Fig. 5 is a front view of a portion of the apparatus similar to that of Fig. 1 showing the forming members in position about a damaged bumper, the pressure distributing member in place, and the pressure producing member about to be applied.

Fig. 6 is a view similar to Fig. 5 showing the condition of the bumper after the pressure has been applied.

Figure 1:
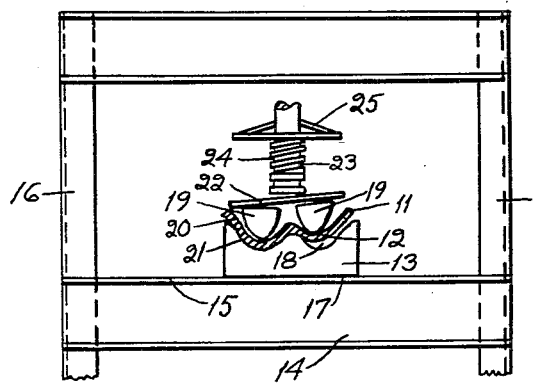
Fig. 1 is a front view of the apparatus that may be used to carry out the method of this invention in a bumper formed with two channels showing the bumper in damaged condition and the forming members and the pressure distributing member in place prior to the application of pressure.
Figure 3:
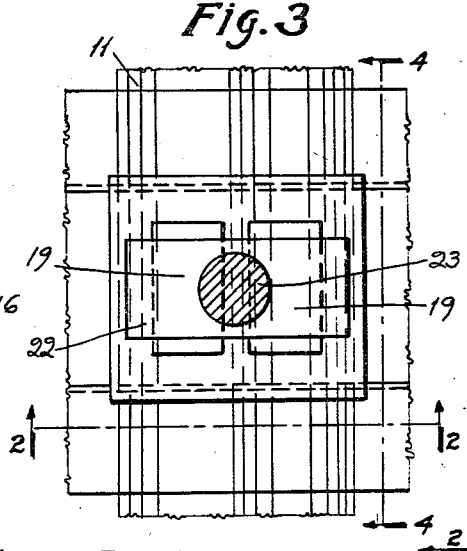
Fig. 3 is a sectional view of the apparatus shown in Fig. 2 taken on lines 3—3 of Fig. 2.
Figure 2:
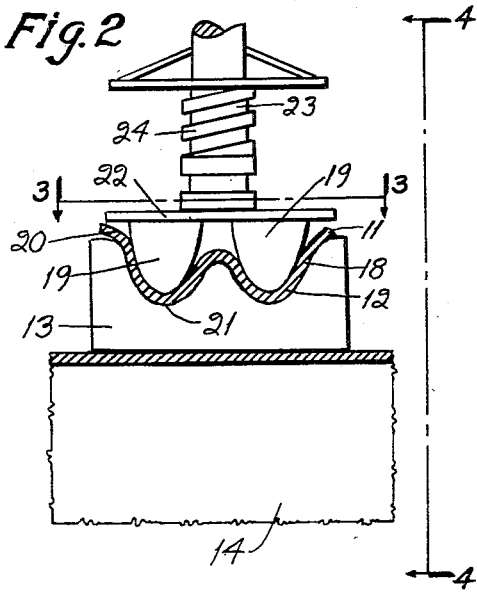
Fig. 2 is a front view of the apparatus of Fig. 1 but showing the bumper in repaired condition after the application of pressure.

Referring now to the drawings in Figs. 1–4 there is shown vehicle bumper 11 which has a damaged portion 12. Forming member 13 is disposed upon support member 14. Support member 14 is formed with plane upper face 15 and it is itself supported by uprights 16.

Forming member 13 is formed with a plane lower face 17 which rests upon support member 14 and is provided with a cavity 18 which is of inverse curvature to the outer surface of bumper 11 against which it abuts.

Forming members 19 abut against inner surface 20 of bumper 11. Forming members 19 are of the proper curvature of the outer surface 21 of bumper 11. In this modification of the invention a two channel bumper is to be straightened. While in this showing the damaged portion 12 is only found in one of the channels of bumper 11 an additional forming member 19 is provided in the other channel to prevent uneven straightening.

Pressure distributing member 22 lies above forming members 19. This member is extremely important since it is necessary that the pressure exerted upon the forming members be uniform. Pressure producing member 23 is adapted to impinge upon pressure distributing member 22 and thus straighten bumper 11. Pressure producing member 23 is provided with threads 24 which turn in sleeve (not shown) so that constantly increasing pressure can be produced upon pressure distributing member 22. Operating handle 25 is provided to operate pressure producing member 23.

In the operation of the invention the damaged portion 12 of bumper 11 is placed between forming members 13 and 19. While two forming members 19 are shown such dual members are only necessary where a two channel bumper is to be straightened. Where the bumper is provided with only one channel only one forming member 19 is required. Forming members 13 and 19 have been previously constructed with the proper curvatures of bumper 11 in an undamaged condition. Pressure distributing member 22 is then placed above forming members 19 and pressure producing member 23 is allowed to impinge upon pressure distributing member 22. Handle 25 is then rotated causing pressure producing member 23 to bear against pressure distributing member 22 and thereby compress the damaged portion 12 of bumper 11 between forming members 13 and 19. Since pressure distributing member 22 is only in floating contact with forming members 19 the pressure produced by pressure producing member 23 produces both a squeezing and a sidewise action and thus smooths out bumper 11 at damaged portion 12 to its undamaged condition. After the bumper has been straightened pressure producing member 23 is moved out of contact with pressure distributing member 22 and members 22, 13, and 19 are removed from bumper 11.

Figs. 5 and 6 show a construction similar to that of Figs. 1-4 except that only one forming member is used on the inner surface of the bumper to be straightened. The form of the invention shown in Figs. 1-4 is used where two dents are in the bumper to be straightened in close proximity to each other. Where only one dent is found in the bumper, or where the dents are far apart from each other the form of the invention shown in Figs. 5 and 6 is used. In this form bumper 11a is placed in abutting relationship between forming member 13a which rests upon a support member 14a and forming member 19a. Damaged portion 12a of bumper 11a is thus between forming members 13a and 19a. Cavity 18a which abuts against a portion of outer surface 21a of bumper 11a is of inverse curvature to the portion of outer surface 21a against which it abuts. Forming member 19a abuts against a portion of inner surface 20a of bumper 11a and is of the same curvature as outer surface 21a over the appropriate portion when the bumper is in undamaged condition.

Pressure distributing member 22a is above forming member 19a and pressure producing member 23a is above pressure distributing member 22a. Operating handle 25a operates pressure producing member 23a.

Figure 4:
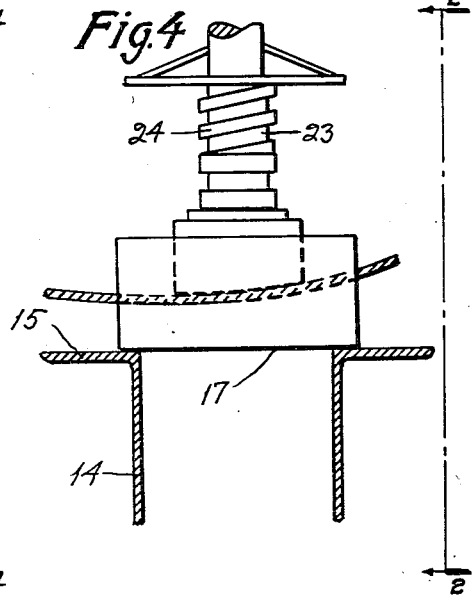
Fig. 4 is a sectional view of the apparatus shown in Fig. 2 taken on lines 4—4 of Fig. 2.

The opertaion of the method of this invention will now be further explained using the form of the invention shown in Figs. 4 and 5.

The damaged portion 12a of bumper 11a is placed between forming members 13a and 19a. Forming members 13a and 19a have been previously selected by obtaining those forming members that have the curvature of the surfaces of bumper 11a when the bumper is in undamaged condition. Pressure distributing member 22a is then placed above forming member 19a and pressure producing member 23a is allowed to impinge upon pressure distributing member 22a. Handle 25a is then rotated causing pressure producing member 23a to bear against pressure distributing member 22a and thereby compress bumper 11a. The pressure is constantly increased until bumper 11a assumes its undamaged form as shown in Fig. 6. Pressure producing member 23a is then moved out of contact with pressure distributing member 22a and pressure distributing member 22a, as well as forming members 13a and 19a are removed.

If pressure distributing member 22a were not used to carry out the method of this invention the pressure applied to forming members 13a and 19a would not be uniform. Therefore the bumper would not be straightened properly and the smooth curvature of the undamaged bumper would not be produced. While the use of the pressure distributing member is highly desirable it is possible to produce bumper straightening without its use. In such event, however, the excellent results otherwise produced are not obtained.

The foregoing specific embodiments of the invention herein as set forth in the specification are for illustrative purposes and for purposes of example only. Various changes and modifications can obviously be made within the spirit and scope of this invention and would occur to those skilled in this art.

I claim:

A press for straightening damaged metallic vehicle bumpers comprising a base, a lower die mounted on said base having an upwardly facing cavity of inverse curvature conforming to the curvature of the outer surface of the bumper to be straightened and having a width equal to a major portion of the width of the bumper, an upper vertically reciprocating pressure member formed with a flat lower surface, and a loose freely shiftable upper die member of a width equal to a major portion of the width of the bumper and constructed with a flat upper surface for engagement with the lower flat surface on the pressure member, and a convex lower surface which conforms to the concave surface of the bumper, wherein the flat lower surface upon said pressure member is constructed with substantially smaller dimensions than the flat upper surface upon said upper die member.

References Cited in the file of this patent

UNITED STATES PATENTS

| 35,496 | Montgomery | June 3, 1862 |
| 1,443,075 | Guilford | Jan. 23, 1923 |
| 2,255,987 | Schultz | Sept. 16, 1941 |

FOREIGN PATENTS

| 105,749 | Great Britain | Nov. 8, 1917 |